(12) United States Patent
Hamilton, II et al.

(10) Patent No.: US 10,380,604 B2
(45) Date of Patent: Aug. 13, 2019

(54) METHOD AND SYSTEM FOR VIRAL MARKETING WITHIN A VIRTUAL WORLD

(75) Inventors: Rick A. Hamilton, II, Charlottesville, VA (US); Jenny S. Li, Danbury, CT (US); Clifford A. Pickover, Yorktown Heights, NY (US); Anne R. Sand, Petyon, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1412 days.

(21) Appl. No.: 12/174,805

(22) Filed: Jul. 17, 2008

(65) Prior Publication Data

US 2010/0017260 A1    Jan. 21, 2010

(51) Int. Cl.
G06Q 30/00     (2012.01)
G06Q 30/02     (2012.01)
G06Q 30/08     (2012.01)

(52) U.S. Cl.
CPC ......... *G06Q 30/02* (2013.01); *G06Q 30/0241* (2013.01); *G06Q 30/08* (2013.01)

(58) Field of Classification Search
CPC ..................................... G06Q 30/00–30/0284
USPC ............................................ 705/14.1–14.73
See application file for complete search history.

(56) References Cited

U.S. PATENT DOCUMENTS

| | | | |
|---|---|---|---|
| 5,884,029 A * | 3/1999 | Brush, II | G06F 3/011 709/202 |
| 6,036,601 A | 3/2000 | Heckel | |
| 6,070,149 A | 5/2000 | Tavor et al. | |
| 6,118,456 A | 9/2000 | Cooper | |
| 6,256,043 B1 | 7/2001 | Aho et al. | |
| 6,329,986 B1 | 12/2001 | Cheng | |
| 6,396,509 B1 | 5/2002 | Cheng | |
| 6,738,065 B1 | 5/2004 | Even-Zohar | |
| 6,801,930 B1 | 10/2004 | Dionne et al. | |
| 6,845,486 B2 | 1/2005 | Yamada et al. | |
| 6,928,414 B1 | 8/2005 | Kim | |
| 6,954,728 B1 | 10/2005 | Kusumoto et al. | |
| 6,968,315 B1 | 11/2005 | Nakisa | |
| 6,981,220 B2 | 12/2005 | Matsuda | |
| 7,054,831 B2 | 5/2006 | Koenig | |
| 7,076,445 B1 | 7/2006 | Cartwright | |
| 7,184,047 B1 | 2/2007 | Crampton | |
| 7,210,104 B2 | 4/2007 | Nakagawa et al. | |
| 2001/0020955 A1 | 9/2001 | Nakagawa et al. | |
| 2002/0040327 A1 | 4/2002 | Owa | |
| 2002/0138607 A1 | 9/2002 | O'Rourke et al. | |
| 2003/0005439 A1 | 1/2003 | Rovira | |
| 2003/0078782 A1* | 4/2003 | Blair | H04M 3/42221 704/270.1 |
| 2004/0030741 A1 | 2/2004 | Wolton et al. | |
| 2004/0064351 A1 | 4/2004 | Mikurak | |
| 2004/0143495 A1 | 7/2004 | Koenig | |

(Continued)

*Primary Examiner* — John Van Bramer

(74) *Attorney, Agent, or Firm* — Brian M. Restauro; Andrew M. Calderon; Roberts Mlotkowski Safran Cole & Calderon, P.C.

(57) ABSTRACT

A method implemented in a computer infrastructure having computer executable code, including generating one or more ad-avatars in a virtual universe (VU) and monitoring information from the VU. Additionally, the method includes directing the one or more ad-avatars to perform one or more viral advertisements in the VU based on the information.

1 Claim, 3 Drawing Sheets

(56) References Cited

U.S. PATENT DOCUMENTS

| | | |
|---|---|---|
| 2004/0148221 A1 | 7/2004 | Chu |
| 2004/0162759 A1 | 8/2004 | Willis |
| 2004/0193441 A1 | 9/2004 | Altieri |
| 2005/0030309 A1 | 2/2005 | Gettman et al. |
| 2005/0086605 A1 | 4/2005 | Ferrer et al. |
| 2005/0086612 A1 | 4/2005 | Gettman et al. |
| 2006/0015904 A1 | 1/2006 | Marcus |
| 2006/0111979 A1 | 5/2006 | Chu |
| 2006/0143095 A1 | 6/2006 | Sandus et al. |
| 2006/0178968 A1 | 8/2006 | Jung et al. |
| 2006/0178975 A1 | 8/2006 | Jung et al. |
| 2006/0287105 A1 | 12/2006 | Willis |
| 2007/0061202 A1 | 3/2007 | Ellis et al. |
| 2007/0061204 A1 | 3/2007 | Ellis et al. |
| 2007/0101276 A1 | 5/2007 | Yuen |
| 2007/0118394 A1 | 5/2007 | Cahoon |
| 2007/0118420 A1 | 5/2007 | Jung et al. |
| 2007/0129148 A1 | 6/2007 | Van Luchene |
| 2007/0156509 A1 | 7/2007 | Jung et al. |
| 2009/0076894 A1* | 3/2009 | Bates ............... G06Q 30/02 705/14.61 |
| 2009/0100035 A1* | 4/2009 | Cradick ............ G06F 16/907 |

* cited by examiner

| Location | Denizen Profile | Products to Sell | Scripts | Ad-avatar Profile |
|---|---|---|---|---|
| IBM ® Almaden Island | Business professionals, tech savy computer users | Wide screen TVs, computers, investment planning | 1) Did you hear about my new BRANDNAME wide screen TV?<br><br>2) My son is off to college. I can afford it because of BRANDNAME Investing. | Joe Geek (with nerdy clothes, glasses and hair) talking with Mr. Business (suit) |
| Teen VU | Teenagers, early 20s, college students | Music players, CDs, concert tickets at Concert Island | 1) Did you hear these BRANDNAME music players are available in purple?<br><br>2) Did you hear about the upcoming shows at Concert Island? | Erin Popular (wearing latest fashion); Jenny Teen (jeans & t-shirt); Jeremy Teen (handsome, in trendy outfit) |
| VU country music concert at Music Island | Country music fans | Other upcoming country music shows; latest country music CDs; pickup trucks | 1) My BRANDNAME pickup truck is the best. Let me tell you why?<br><br>2) Have you heard this country music compilation CD with all the greatest artists? | Travis Cowboy (flannel shirt, cowboy hat) talking with Joe Trucker (jeans, cowboy hat) |

Figure 2

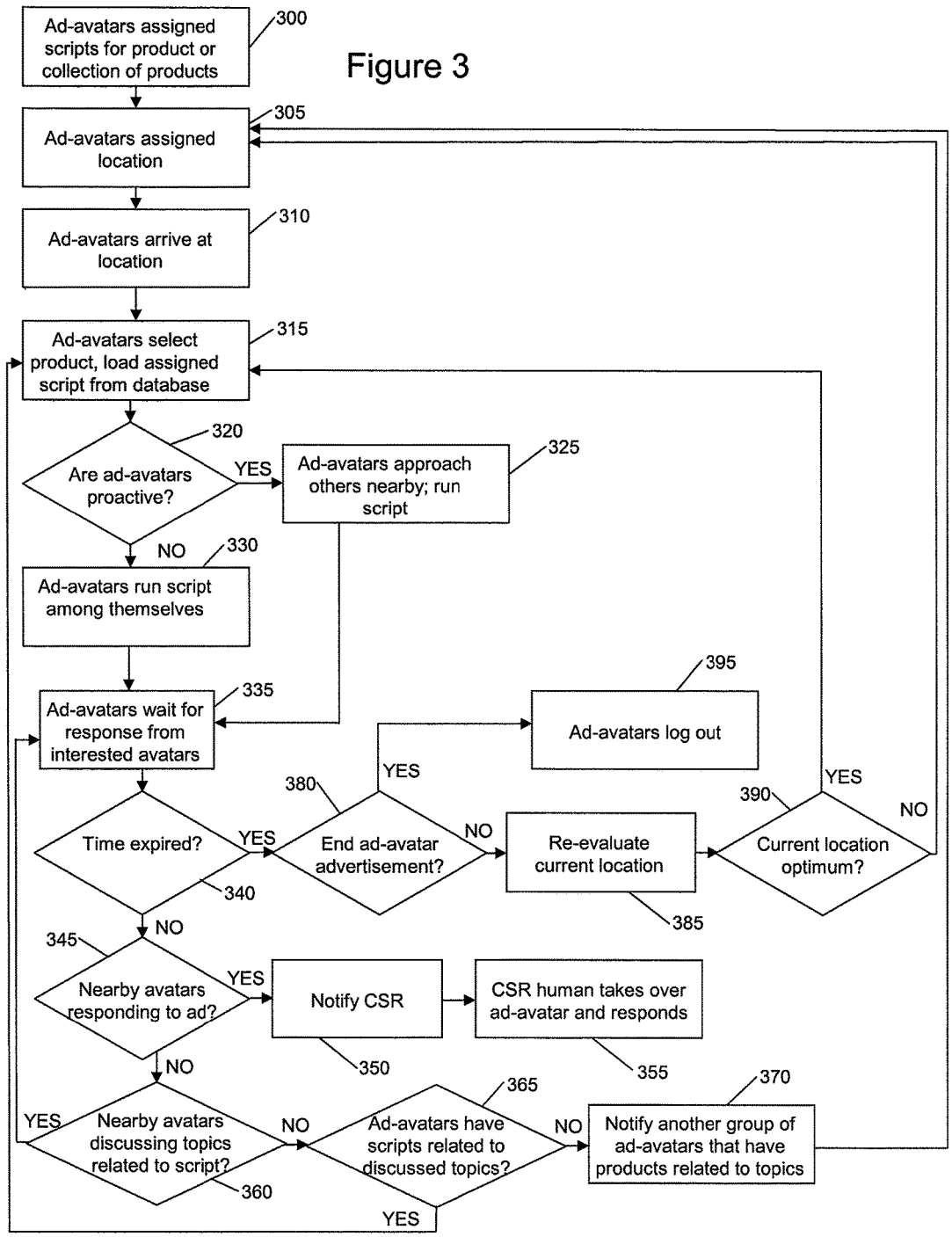

METHOD AND SYSTEM FOR VIRAL MARKETING WITHIN A VIRTUAL WORLD

FIELD OF THE INVENTION

The present invention generally relates to computer-based virtual universes, and more specifically, the present invention relates to a method and system for viral marketing within a virtual world.

BACKGROUND OF THE INVENTION

Virtual universes (VUs) are rapidly becoming a popular part of today's culture. In general, a VU is a digital world, such as SECOND LIFE™ (SECOND LIFE is a trademark of Linden Research, Inc. in the United States and/or other countries), characterized by avatars interacting with other avatars and/or other virtual surroundings. In operation of a VU, user(s) control the avatar(s).

An avatar is a graphical representation of the user, often taking the form of a cartoon-like human or other figure. The user's account, upon which the user can build an avatar, is tied to the inventory of assets the user owns. A region is a virtual area of land within the VU, typically implemented utilizing a server. Assets, avatar(s), the environment, and everything else visually represented in the VU each comprise universally unique identifiers (UUIDs) (tied to geometric data distributed to user(s) as textual coordinates), textures (distributed to user(s) as graphics files), and effects data (rendered by the user's client according to the user's preference(s) and user's device capabilities).

On-line virtual universes or environments present a tremendous new outlet for both structured and unstructured virtual collaboration, gaming and exploration, as well as real-life simulations in virtual spaces. These activities, along with yet to be disclosed new dimensions, in turn, provide a wide open arena for creative and new advertising methods and mechanisms.

SUMMARY OF THE INVENTION

In a first aspect of the invention, a method implemented in a computer infrastructure having computer executable code, comprises generating one or more ad-avatars in a virtual universe (VU) and monitoring information from the VU. Additionally, the method comprises directing the one or more ad-avatars to perform one or more viral advertisements in the VU based on the information.

In another aspect of the invention, a system comprises a computer infrastructure configured to provide one or more ad-avatars in a virtual universe (VU) which perform one or more viral advertisements in the VU based on interaction within the VU.

In another aspect of the invention, a computer program product comprising a computer usable medium having readable program code embodied in the medium is provided. The computer program product includes at least one component to configure one or more ad-avatars in a virtual universe (VU) and monitor information from the VU. Additionally, the at least one component is configured to instruct the one or more ad-avatars to perform one or more viral advertisements in the VU based on the information.

In an additional aspect of the invention a method comprises providing a computer infrastructure operable to generate one or more ad-avatars in a virtual universe (VU). Additionally, the computer structure is operable to monitor information from the VU and direct the one or more ad-avatars to perform one or more viral advertisements in the VU based on the information.

BRIEF DESCRIPTION OF THE DRAWINGS

The present invention is described in the detailed description which follows, in reference to the noted plurality of drawings by way of non-limiting examples of exemplary embodiments of the present invention.

FIG. 2 shows an exemplary ad-avatar database according to the invention; and

FIG. 3 is an exemplary flow chart of steps for implementing aspects of the invention.

DETAILED DESCRIPTION OF EMBODIMENTS OF THE INVENTION

Figure 1:
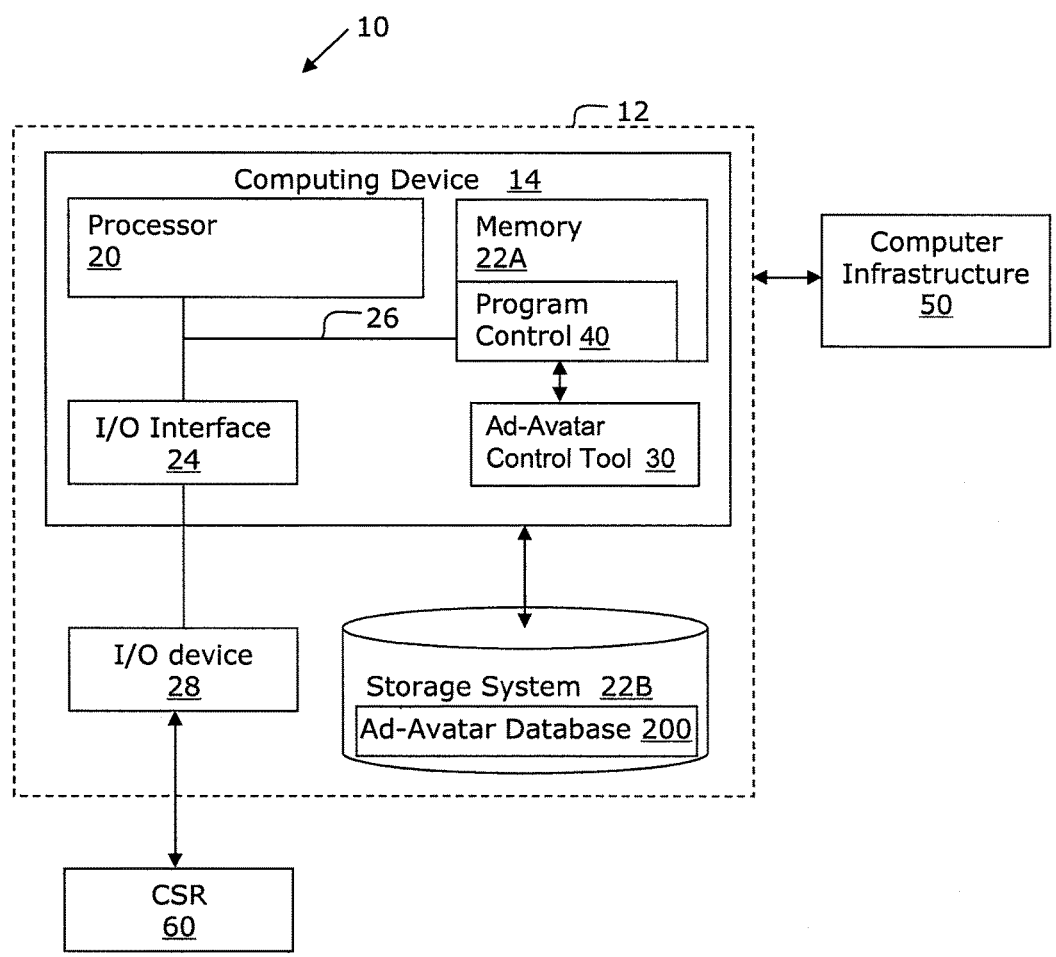
FIG. 1 shows an illustrative environment for implementing the steps in accordance with the invention.

The invention is directed to a method and system for viral marketing within a virtual universe (VU). By implementing the present invention, an advertiser may utilize viral advertising, and the consumers' affinity for (and trust of) viral advertising, to more effectively advertise within a virtual universe.

Viral marketing is a technique that encourages users to pass along, e.g., a marketing message to create a "buzz" about a product or service. This is akin to word of mouth marketing, which has been proven to be a very effective marketing tool. For example, customers generally trust the recommendations of other people about, e.g., a product, more than paid advertising provided by the sellers of the product. Viral marketing works for both the real world and the virtual universes. However, in VUs, participants (through their avatar) tend to be more sociable, open-minded and willing to try new things. In fact, it appears that users are adopting to a different set of social skills in VUs. For example, people tend to interact more freely with other avatars than in real-world situations. With this unique social environment, viral marketing which combines the use of "word of mouth" and avatar presence can be effectively used for promoting products or services.

According to an aspect of the invention, software controlled ad-avatars (or bots) and objects are utilized for viral marketing. In embodiments, ad-avatars appear to be conventional avatars and are configured to talk with other ad-avatars or customer avatars about a certain topic, e.g., a service or product. The ad-avatars may present ads conversationally in an attempt to sway opinions about a product or service. Accordingly, by implementing the invention, an advertiser may capitalize on VU participants' affinity for and trust of other avatars and hence, viral advertising.

In implementation an avatar may overhear the viral advertising and inquire or query, e.g., the ad-avatar. At such time, a signal may be sent to a human customer service representative (CSR). The CSR can then take control of the ad-avatar to answer the potential customer's questions. That is, the invention also provides arrangements for the incipient conversation between a potential customer avatar and the ad-avatar to be redirected, or handed back to, a live CSR, who then staffs the previously automated ad-avatar.

According to a further aspect of the invention, an ad-avatar database may contain target customer profiles, locations, ad-avatar profiles, scripts and behaviors. Moreover, these features in the database may be selected based on optimal viral marketing strategies and methods in order to target certain audiences. Thus, by implementing this aspect of the invention, an advertiser can more effectively place viral ads, e.g., ad-avatars in locations and times within the VU, where the advertiser believes those ads will be most effective.

System Environment

FIG. 1 shows an illustrative environment 10 for managing the processes in accordance with the invention. To this extent, the environment 10 includes a computer infrastructure 12 that can perform the processes described herein. The computer infrastructure 12 includes a computing device 14 that comprises an ad-avatar control tool 30 operable to control one or more ad-avatars in a VU, e.g., process described herein. By utilizing the ad-avatar control tool 30, a user, e.g., an advertiser, a manager of a VU or a service provider, may control one or more ad-avatars in one or more VUs to present viral advertising to potential customer avatars. In embodiments, the ad-avatar control tool 30 may be used to select which ad-avatars to place in a VU and which locations in the VU to place the ad-avatars. Also, the ad-avatar control tool 30 may be used to redirect, or handover, a potential customer avatar to a CSR from an ad-avatar.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution.

Further, the computing device 14 is in communication with an external I/O device/resource 28. The external I/O device/resource 28 may be keyboards, displays, pointing devices, etc. The I/O device 28 can interact with the computing device 14 or any device that enables the computing device 14 to communicate with one or more other computing devices using any type of communications link. For example, the I/O device 28 may be used to allow one or more human customer service representatives (CSRs) 60 to control ad-avatars, as is discussed further below. Thus, for example, in embodiments the I/O device 28 may include a keyboard, a mouse, and/or a microphone (with voice recognition capability), amongst other I/O devices.

Additionally, in embodiments, the computing device 14 includes a storage system 22B. Storage system 22B may contain an ad-avatar database 200 for use by the ad-avatar control tool 30, as discussed further below.

The processor 20 executes computer program code (e.g., program control 40), which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols. In embodiments, the computer infrastructure 12 may communicate with another computer infrastructure 50, which is operating the VU. However, the invention contemplates that the computer infrastructure 12 may operate both the ad-avatar control tool 30 (and the ad-avatar database 200) and operate the VU.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Properties of Ad-Avatars and Inanimate Objects

According to an aspect of the invention, both ad-avatars and inanimate objects may be used to perform viral marketing. That is, while the present disclosure is described with reference to ad-avatars, the invention contemplates that inanimate objects within the VU may also be used to perform viral advertising. For example, the inanimate objects may include billboards, trees, placards, signs, amongst other inanimate objects.

Additionally, in embodiments, the ad-avatars (and inanimate objects) may posses the following qualities and/or skills in order to perform viral marketing within a VU:

Ad-avatar discussion and demonstration skills;
Listening and information mining skills;
Ad-avatar context switching based on real-time input from the environment;
Crowdedness or presence detection, and relocation;
Response detection and redirection; and
Reactive or proactive avatar behaviors, amongst other components.

These above qualities and/or skills may be provided by the ad-avatar control tool 30.

Discussion and Demonstration Skills

More specifically, one or more ad-avatars may possess ad-avatar discussion and demonstration skills. That is, the ad-avatar control tool 30 may be configured to control one or more ad-avatars, such that the ad-avatars may discuss, use or demonstrate, e.g., a product or service. As potential customers (e.g., potential customer avatars) see the product or service in use and hear the positive dialog, positive impressions may be created, generating interest in the product or service. Additionally, in embodiments, the ad-avatar control tool 30 may control (or provide from the ad-avatar database 200) gestures of the ad-avatars, with pre-scripted motions (e.g., an ad-avatar waving their hand, which has thereon a new type of watch), provide well-planned outfits (e.g., tailored for a particular audience), accessories, or even pre-scripted actions (e.g., a pick-up basketball game to advertise a basketball manufacturer) and/or pre-scripted conversations (verbal or textual) to draw attention from participants in the VU. In embodiments, the script may define each ad-avatar's role, speech and actions.

For example, the ad-avatar control tool 30 may direct ad-avatars to demonstrate and discuss consumer products and related services. Thus, according to this scenario, as an illustrative example, in an area known to be populated by young men, the ad-avatar control tool 30 may select ad-avatars dressed in martial arts clothing. Moreover, the ad-avatar control tool 30 may direct the ad-avatars to display gestures, use weapons and discuss the merits of a martial arts supply store. Additionally, the ad-avatar control tool 30 may direct the ad-avatars to also discuss the merits of either in VU or real life services that teach martial arts.

Listening and Information Mining Skills

In embodiments, the ad-avatar control tool 30 may provide one or more ad-avatars with listening and information mining skills. That is, the ad-avatar may gather real-time information from the surrounding VU environment so that it can be analyzed against a database of target customers, locations, products, ad-avatar data, historical incidents and/or interactions between ad-avatars and potential customer avatars, and/or historical viral marketing results. The real-time information may be, for example, conversations, the environment, or other avatar attributes, e.g., clothing, accessories, assets, inventory, gender, etc. In this way, the ad-avatar control tool 30 can direct the ad-avatars to listen to nearby conversations and/or observe the environment; and, using keyword or concept matching, the ad-avatar control tool 30 can detect the topics of the conversations of potential customer avatars. With this information, the ad-avatar control tool 30 can modify the behavior of and scripts run by the one or more ad-avatars to begin or customize viral advertisements. For example, upon detecting a conversation of potential customer avatars relating to dancing at clubs, the ad-avatar control tool 30 may direct one or more ad-avatars to start dancing or inquire whether those potential customer avatars would be interested in seeing a new dance move learned at dance club XYZ.

Context Switching

In embodiments, the ad-avatar control tool 30 may be configured to allow ad-avatar context switching based on real-time input from the environment. More specifically, the ad-avatar control tool 30 may be configured to change ad-avatar context (e.g., location, appearance, behavior, gestures, script selection, etc.) based on a potential customer avatar and real-time input from the VU environment. The environmental information may include activities in the surrounding area such as, for example, changes in population and potential customer avatar discussions, behaviors or level of interest in ad-avatar topics, amongst other environmental information.

The ad-avatar control tool 30 may be configured to query the ad-avatar database 200 at any time to dynamically change strategy based on this real-time data. For example, if a potential customer avatar switches discussion topics from real estate to action movies, the ad-avatar control tool 30 may be configured to change ad-avatars' behavior and/or appearance, for example, running a script that talks about places that sell cheaper movie tickets, or places that show movies. Additionally, for example, the ad-avatar control tool 30 may be configured to display an ad-avatar showing some martial arts moves, while another ad-avatar may put on a t-shirt advertising another movie.

Additionally, in embodiments, if a discussion topic or environmental input is beyond the knowledge base of a particular group of the ad-avatars, the ad-avatar control tool 30 may query the ad-avatar database 200 to obtain information about the topic. This will allow the ad-avatar to promote relevant topics in viral advertisements. The ad-avatar control tool 30 may also notify, for example, an automated or manually controlled back-end system to send another ad-avatar (or group of ad-avatars) with the requisite knowledge base to the current location.

For example, the ad-avatar control tool 30 may direct ad-avatars to discuss various products, based on real-time external input to the ad-avatar control tool 30. Thus, according to this exemplary scenario, the ad-avatar control tool 30 may place ad-avatars in a location typically frequented by teenagers. Due to location and target audience, the ad-avatar control tool 30 may direct the ad-avatars to start a conversation talking about audio players. If no one approaches the ad-avatars within a predetermined period of time, e.g., 5 minutes, the ad-avatar control tool 30 may direct the ad-avatars to listen for conversations happening around them so that the ad-avatar control tool 30 may select related topics and scripts from the ad-avatar database 200. For example, the ad-avatar control tool 30 may determine that the ad-avatars hear a potential customer avatar talking about a particular country music artist, and conclude that a country music fan is in the area. In response, the ad-avatar control tool 30 may load a new script for the ad-avatars (or load different ad-avatars) to discuss an upcoming concert for a country singer. Additionally, if the ad-avatar control tool 30 detects that nearby potential customer avatars discussing the current subject leave the area, the ad-avatar control tool 30 may trigger ad-avatars to listen for other topics and may load a new script from the ad-avatar database 200.

Crowdedness or Presence Detection

In embodiments, the ad-avatar control tool 30 may be configured for crowdedness or presence detection, and relocation. That is, the ad-avatar control tool 30 can dynamically determine or change a location of ad-avatars based on real-time environmental feedback. For example, if a current location becomes less desirable (e.g., is becoming less populated by potential customer avatars), the ad-avatar control tool 30 will detect this change in crowdedness, or potential customer avatar presence, and notify the automatic or manually-controlled back-end system to consider other location options for the one or more ad-avatars. Also, for example, if the area that ad-avatars are currently placed within is not generating interest, or other locations become more populated (as detected by the ad-avatar control tool 30), the ad-avatar control tool 30 can transport, e.g., teleport, the ad-avatars to a more desirable location in the VU.

In further embodiments, the ad-avatar control tool 30 can set a crowdedness indicator measured by the number of avatars per a defined size of area. The ad-avatar control tool 30 can place ad-avatars in one or more locations to present a perception of crowdedness and increased popularity of those one or more locations. In this way, other potential customer avatars may be prone to visit this crowded location, thus allowing the ad-avatars to more effectively advertise products or services. For example, the ad-avatar control tool 30 may direct ad-avatars to create the perception of increased popularity of location in a VU for a newly-opened dance club. The ad-avatar control tool 30 may direct a plurality (e.g., fifteen) of ad-avatars to dance and lounge at the bar of the dance club, discussing the popularity of the new club. According to the invention, this gives potential customer avatars the perception that the new club is a popular place to be, which offers many socialization opportunities.

Response Detection and Redirection

In embodiments, the ad-avatar control tool 30 may be configured for response detection and redirection. That is, the ad-avatar control tool 30 can detect if a potential customer avatar is responding to an ad-avatar, e.g., a message is sent to any ad-avatar within a group of ad-avatars. If the potential customer avatar is responding to the ad-avatar, a dialog may be started with one or more potential customer avatars. The ad-avatar control tool 30 can also redirect the potential customer avatar to one or more human customer service representatives (CSRs) 60 via the I/O device 28. Upon redirection, or hand-over, the one or more CSRs 60 are able to continue the conversation with the potential customer avatar. As should be understood, a human CSR 60 may monitor and manage numerous automated ad-avatars.

In embodiments, the human CSRs 60 may be segmented, such that particular CSRs 60 cover particular topics or products. This may allow the CSRs 60 to specialize within a particular niche of topics or products, and become more proficient in maintaining a dialog with one or more potential customer avatars after redirection, or hand-over, by the ad-avatar control tool 30. Upon hand-over of a potential customer avatar from an ad-avatar to a human CSR 60, the ad-avatar control tool 30 can present the human CSR 60 with a transcript of the dialog that occurred between the potential customer avatar and the ad-avatar prior to the redirection, or hand-over. This will allow the transition from ad-avatar to human CSR 60 to appear seamless. This may also improve the quality of customer service provided to the potential customer avatar from the ad-avatar.

Furthermore, upon redirection or hand-over, (or at any time) the ad-avatar control tool 30 may furnish the human CSRs 60 with associated scripts to further carry on a conversation with a potential customer avatar. This will allow the transition from ad-avatar to human CSR 60 to appear seamless and smooth, and consequently, unnoticed by the potential customer avatar.

Reactive or Proactive Ad-Avatars

In embodiments, the ad-avatar control tool 30 may be configured such that the ad-avatars are reactive or proactive. For example, reactive ad-avatars perform conversations or act out scripts in the VU among themselves to promote products or generate interest. Moreover, the reactive ad-avatars will not initiate any conversations with other avatars. Instead, the reactive ad-avatars will wait for interested potential customer avatars to approach them while performing the viral marketing.

For example, the ad-avatar control tool 30 may place ad-avatars sitting in a coffee shop. Additionally, the ad-avatar control tool 30 may direct the ad-avatars to discuss how much money they saved on auto insurance by switching to a particular insurance company. Furthermore, in this exemplary scenario, a potential customer avatar walks by and hears this conversation. Thus, the potential customer avatar asks the ad-avatars for more information. This interaction causes the ad-avatar control tool 30 to send a signal to a human CSR to take over control of the automated ad-avatars. Then, according to the invention, the CSR controls the ad-avatars and completes the dialog with the potential customer avatar.

The ad-avatars may also be proactive ad-avatars. In this scenario, the proactive ad-avatar would proactively approach other avatars with, e.g., generic greetings or conversation. For example, a proactive ad-avatar may approach a potential customer avatar and say, "Hello, would you mind giving me some feedback about my new business suit? I'll show you." In this way, the ad-avatars may take the initiative to approach the potential customer avatars, establish a friendship and promote, e.g., new products.

Moreover, in embodiments, groups of ad-avatars may be profiled to handle, e.g., a variety of product promotions. For example, one or more ad-avatars may be configured to appeal to teenagers (e.g., with trendy outfits) and may be configured to handle a variety of teen products. That is, for example, these ad-avatars may be configured with associated scripts for each of these teen products. Moreover, each product promotion may be associated with a script, which specifies the role of each ad-avatar and his/her lines.

Ad-Avatar Database

In embodiments, the ad-avatar database 200 may be used to link ad-avatars (or ad-avatar profiles) with VU locations, products, scripts and target customer profiles. In embodiments, the ad-avatar database 200 may be stored in the storage system 22B as shown in FIG. 1.

FIG. 2 shows exemplary database entries in the ad-avatar database 200. Accordingly, the examples of FIG. 2 should not be construed as limiting the scope of the embodiments of the invention.

As shown in FIG. 2, the database 200 may contain a plurality of columns including columns for location 205, denizen (or potential customer) profile 210, products to sell 215, scripts 220, and ad-avatar profiles 225, amongst other columns. The location column 205 indicates particular VUs or locations within VUs where the ad-avatar control tool 30 may place the ad-avatars. The denizen profile column 210 indicates a target profile for a potential customer (who controls the potential customer avatar) in the VU. The products to sell column 215 indicates the products (or services) that the particular ad-avatars are configured to sell. The scripts column 220 indicates the scripts that the ad-avatar control tool 30 may load for those particular ad-avatars. The ad-avatar profile column 225 indicates the particular ad-avatars profiles (or how the ad-avatars are represented or configured) the ad-avatar control tool 30 may utilize to perform the viral advertising.

For example, the ad-avatar control tool 30 may direct ad-avatars to display and discuss specific consumer products. Thus, according to this scenario, the ad-avatar control tool 30 may detect a VU profile that indicates that twenty members of a user group known to contain customers in the target demographic have congregated in a particular location in the VU. The ad-avatar control tool 30 may query the ad-avatar database 200 to select ad-avatars appropriate for the customer base of potential customer avatars. Using the example profiles shown in the table of FIG. 2, the ad-avatar control tool 30 may select Erin Popular and Jenny Teen. Additionally, the ad-avatar control tool 30 may design the ad-avatars clothed in outfits and jewelry from an apparel store and may teleport them to the particular location where the crowd of potential customer avatars has congregated. Furthermore, the ad-avatar control tool 30 may direct the ad-avatars to walk around the area, stopping near potential customer avatars. Additionally, the ad-avatar control tool 30 may direct the ad-avatars to play a script relating to outfits, wherein the ad-avatars discuss how much they like each other's outfit. Moreover, if, after a predetermined period of time, e.g., twenty minutes, the ad-avatar control tool 30 detects that the area has become less populated and no potential customer avatars have interacted with the ad-avatars, the ad-avatar control tool 30 may teleport the ad-avatars to a more populated location.

As should be understood, in embodiments, the ad-avatar database 200 may be larger than the exemplary embodiment shown in FIG. 2. For example, the ad-avatar database 200 may contain any number, e.g., hundreds, of locations, denizen (or potential customer avatar) profiles, products to sell, scripts, and/or ad-avatar profiles. Moreover, the ad-avatar database 200 may be dynamically updated at any time, including in real-time. That is, a user (e.g., a VU manager, an advertiser or a service provider) may, at any time, add, change and/or update ad-avatar locations, scripts, profiles, products for sale, and denizen profiles. Additionally, in embodiments, the ad-avatar database 200 may contain associated scripts for human CSRs 60, to allow the human CSRs 60 to continue dialogs with potential customer avatars after a redirection, or hand-over, as discussed above.

Flow Diagram

The steps of the flow diagram described herein may be implemented in the environment of FIG. 1. The flow diagram may equally represent a high-level block diagram of the invention. The steps of the flow diagram may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 3 shows an exemplary flow chart for performing steps of the invention. At step 300, the ad-avatar control tool queries the ad-avatar database to retrieve automated ad-avatars and scripts for a target customer market. At step 305, the ad-avatar control tool selects one or more VUs and/or one or more locations in the VUs and scripts based on the ad-avatars' target customer market, or audience, and current population of potential customer avatars. At step 310, the ad-avatar control tool places one or more automated avatars in a location within the VU and load scripts so that the one or more ad-avatars are able to begin, e.g., a conversation. At step 315, the ad-avatar control tool directs one or more ad-avatars to begin the viral advertisement, e.g., execute the script. The script, for example, may be a combination of words, gestures, and/or appearances.

At step 320, the ad-avatar control tool configures the ad-avatars to be reactive or proactive. If, at step 320, the ad-avatar control tool configures the ad-avatars to be proactive, at step 325, the ad-avatars may begin to approach potential customer avatars. If, at step 320, the ad-avatar control tool configures the ad-avatars to be reactive, at step 330, the one or more ad-avatars may run a script among themselves with no interruption to potential customer avatars.

At step 335, the ad-avatars wait for responses from potential customer avatars. At step 340, the ad-avatar control tool determines if a predetermined time period, e.g., ten minutes has expired. In embodiments, the predetermined time period may be configured to be any period of time. If, at step 340, the time period has expired, the ad-avatar control tool determines whether to end the ad-avatar advertisement. If, at step 380, the ad-avatar control tool decides to end the advertisement, at step 395, the ad-avatars log out of the VU. If, at step 380, the ad-avatar control tool decides not to end the advertisement, at step 385, the ad-avatar control tool re-evaluates the current location in the VU. At step 390, the ad-avatar control tool determines whether the current location in the VU is optimum. If, at step 390, the ad-avatar control tool 30 determines that the current location in the VU is optimum, then the process continues at step 315. If, at step 390, the ad-avatar control tool 30 determines that the current location is not optimum, the process continues at step 305.

If, at step 340, the time period has not expired, at step 345, the ad-avatar control tool determines if potential customer avatars are responding to the ad-avatars. That is, for example, the ad-avatar control tool determines whether a potential customer avatar asks a question or interacts with an ad-avatar.

If, at step 345, the ad-avatar control tool determines that potential customer avatars are responding to the ad-avatars, then at step 350, the ad-avatar control tool causes an interrupt that signals human CSR, to notify the CSR of the responding potential customer avatar. At step 355, the ad-avatar control tool redirects, or hands-over, the potential customer avatar to the CSR, so that the CSR may take over the ad-avatar and respond to the potential customer avatar.

If, at step 345, the ad-avatar control tool determines that the potential customer avatars are not responding to the ad-avatars, then at step 360, the ad-avatar control tool determines whether potential customer avatars are discussing topics related to the assigned script. If, at step 360, the ad-avatar control tool determines that the potential customer avatars are discussing topics related to the script, the process may continue at step 335. That is, the ad-avatar control tool may keep the ad-avatar in the original script. In embodiments, the ad-avatar control tool may use keyword or concept matching to detect relations between ongoing potential customer avatar dialogs and scripts in the ad-avatar database. Moreover, the ad-avatars may continue with the script or replay the script.

If, at step 360, the ad-avatar control tool determines that the nearby potential customer avatars are not discussing topics related to the script, at step 365, the ad-avatar control tool determines whether the ad-avatars have product scripts related to the topics the potential customer avatars are discussing. This may be done by querying the ad-avatar database. If, at step 365, the ad-avatar control tool 30 determines that the ad-avatars do have a product script related to the topics the potential customer avatars are discussing, then the process continues at step 315. If, at step 365, the ad-avatar control tool determines that the ad-avatars do not have a product script related to the topics the potential customer avatars are discussing, then, at step 370, the ad-avatar control tool notifies another group of ad-avatars already in the VU (or may load or log on one or more other ad-avatars) that have products related to the topics the potential customer avatars are discussing. For the other group of ad-avatars, the process then continues at step 305. Moreover, for the ad-avatars that do not have a product script related to the topics the nearby potential customer avatars are discussing, the process also continues at step 305, where the ad-avatar control tool 30 may select another VU location.

It should be understood, that while the steps have been described as occurring in a particular order, the invention contemplates that the steps may be performed in other orders. For example, step 320 may occur after step 325. Additionally, some steps may occur at any time. For example, steps 330 and 335 may occur at any time. Furthermore, the invention contemplates that, in embodiments, steps may be implied or omitted while still remaining true to this invention.

Additional Implementations and Embodiments

At any time, if potential customer avatars seem to detect that the ad-avatars are automated, the ad-avatar control tool may record this information (e.g., who detected the ad-avatar, where the detection occurred, when the detection occurred, etc.) and change the ad-avatar appearance before a next use. This will allow the ad-avatar control tool 30 or a user of the invention, e.g., a service provider, an advertiser or VU manager, to prevent further discovery of the ad-avatars that are performing the viral advertisements.

Additionally, at an end of a session (or at any time), the ad-avatar control tool 30 may record, e.g., in the ad-avatar database 200, statistics, for example, on the number of interactions with the potential customer avatars, the scripts that generated interest, the number of resulting sales, amongst other statistical data. The ad-avatar control tool 30 may also update the ad-avatar database 200 with these statistics to tune (e.g., automatically or manually by, e.g., an advertiser, a service provider or a VU manger) the ad-avatar profiles, scripts, products, and/or customer profiles to optimize the ad-avatar viral advertising.

The ad-avatar control tool 30 may utilize the recorded statistics for compensation purposes. For example, the ad-avatar control tool 30 may keep track of which products were successfully virally advertised, e.g., generated a response from a potential customer avatar, so that compensation may be paid, or remunerated for placing the viral advertisement.

Additionally, while the invention has been described using the ad-avatar control tool 30 to control the operations of the ad-avatars, the invention contemplates that any of the operations performed by the ad-avatar control tool 30 may be performed manually by a user (e.g., a VU manager, an advertiser or a service provider). For example, a user may: select an area in the VU to place viral advertisements; monitor ongoing discussions of potential customer avatars within a region of the VU and place ad-avatars in the region; and/or detect a congregation of potential customer avatars in a region of the VU and direct ad-avatars to the region.

Example Scenarios

According to a further aspect of the invention, the following are additional exemplary scenarios utilizing the invention. Accordingly, the examples should not be construed as limiting the scope of the embodiments of the invention.

With a first exemplary scenario, the ad-avatar control tool 30 may direct ad-avatars to promote an image or person. Thus, with this scenario, the ad-avatar control tool 30 may direct ad-avatars to discuss the merits of a real-life person, e.g., a presidential candidate. Moreover, the ad-avatar control tool 30 may direct the ad-avatars to debate issues. Furthermore, in embodiments, the ad-avatar control tool 30 may direct the conversation to show the good deeds and characteristics of this person.

With a further exemplary scenario, the ad-avatar control tool 30 may direct inanimate objects to modify their advertising message based on real-time environmental input. As should be understood, the ad-avatar control tool 30 should not be construed or limited to controlling only ad-avatars, but may be used to control inanimate objects as well. Thus, with this exemplary embodiment, the ad-avatar control tool 30 may utilize a billboard which "overhears" a conversation on stock markets and displays a certain stock price. As a further example, the ad-avatar control tool 30 may direct a tree to listen and grow more leafy, with orange fruit ripe for the picking if the nearby conversations suggest that this would be of value.

While the invention has been described in terms of embodiments, those skilled in the art will recognize that the invention can be practiced with modifications and in the spirit and scope of the appended claims.

What is claimed is:
1. A method comprising:
providing a computer infrastructure operable to:
generate one or more ad-avatars in a virtual universe (VU);
monitor and gather real-time information from the VU by listening and observing a surrounding VU environment including other avatars and attributes of the other avatars by concept matching to detect topics of conversations of potential customer avatars;
direct the one or more ad-avatars to perform one or more customized viral advertisements in the VU by modifying behaviors and scripts run by ad-avatars based on the real-time information by analyzing the real-time information against a database of target customers, locations, products, ad-avatar data, his- torical incidents, interactions between ad-avatars and a potential customer avatar and historical viral marketing results;

notify a customer service representative (CSR) when a response from the potential customer avatar is detected;

allow the CSR to take over control of the one or more ad-avatars to manage a dialog between the one or more ad-avatars and the potential customer avatars; and provide the CSR with associated scripts to further carry on the dialog with the potential customer avatar.

* * * * *